US009586482B2

(12) United States Patent
Müller

(10) Patent No.: US 9,586,482 B2
(45) Date of Patent: Mar. 7, 2017

(54) ADVANCING UNIT FOR POSITIONING A CURRENT COLLECTOR UNIT

(71) Applicant: CONDUCTIX-WAMPFLER GMBH, Weil am Rhein (DE)

(72) Inventor: Jörg Müller, Rheinfelden (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 88 days.

(21) Appl. No.: 14/429,859

(22) PCT Filed: Dec. 18, 2013

(86) PCT No.: PCT/EP2013/077138
§ 371 (c)(1),
(2) Date: Mar. 20, 2015

(87) PCT Pub. No.: WO2014/106579
PCT Pub. Date: Jul. 10, 2014

(65) Prior Publication Data
US 2015/0231973 A1    Aug. 20, 2015

(30) Foreign Application Priority Data

Jan. 2, 2013  (DE) .................. 10 2013 100 019

(51) Int. Cl.
*B60L 5/39*    (2006.01)
*B60L 5/08*    (2006.01)

(52) U.S. Cl.
CPC .. *B60L 5/39* (2013.01); *B60L 5/08* (2013.01)

(58) Field of Classification Search
CPC ...... B60L 5/08; B60L 5/40; B60L 5/42; B60L 5/04; B60L 5/06

(Continued)

(56) References Cited

U.S. PATENT DOCUMENTS

| 2,190,213 | A | * | 2/1940 | Meyer | ................. | B23Q 11/085 |
| | | | | | | 16/96 R |
| 5,355,804 | A | * | 10/1994 | Garcia | .................... | B61C 13/04 |
| | | | | | | 104/296 |

(Continued)

FOREIGN PATENT DOCUMENTS

| DE | 940798 | 3/1956 |
| DE | 44 30 492 | 2/1996 |

(Continued)

OTHER PUBLICATIONS

Written Opinion dated Jul. 2, 2015 for PCT/EP2013/077138 filed Dec. 18, 2013.

(Continued)

*Primary Examiner* — Jason C Smith
(74) *Attorney, Agent, or Firm* — Paul D. Bianco; Fleit Gibbons Gutman Bongini & Bianco PL

(57) ABSTRACT

An advancing unit for positioning a current collector unit having at least one extension, which is guided in a fastening unit so that the extension can be moved linearly and which has a cavity, open on a longitudinal side extending in the advancing direction and the inner surface of which forms a contact surface for guiding elements arranged on the fastening unit. A flexible band is arranged on the extension. One section of the flexible band at least partially covers the open longitudinal side of the cavity along a section protruding from the fastening device, and another section of the flexible band is located in a reservoir. A first end of the band is connected to the fastening unit or to an end of the extension and the second end is supported on a tensioning device under a tensile stress in the longitudinal direction, which tensioning device, in the event of a motion of the extension by means of which the protruding section is shortened or lengthened, pulls the band into the reservoir or outputs the (Continued)

band from the reservoir by the same length and at the same velocity.

14 Claims, 3 Drawing Sheets

(58) Field of Classification Search
USPC .................................. 191/46, 49, 59.1, 45 R
See application file for complete search history.

(56) References Cited

U.S. PATENT DOCUMENTS

| | | | |
|---|---|---|---|
| 6,571,932 B1* | 6/2003 | Kawashima | B23Q 1/58 198/494 |
| 6,764,067 B2 | 7/2004 | Kashiwagi et al. | |
| 8,272,286 B2* | 9/2012 | Aso | F16C 29/082 277/650 |
| 2002/0096413 A1* | 7/2002 | Holuka | B60L 5/38 191/45 R |
| 2004/0041325 A1* | 3/2004 | Kashiwagi | B23Q 11/085 269/73 |
| 2005/0139441 A1* | 6/2005 | Nakao | B60L 5/005 191/22 R |
| 2006/0016363 A1* | 1/2006 | Nakao | G05D 1/0229 104/88.01 |
| 2007/0000405 A1* | 1/2007 | Nakao | E01B 25/12 104/130.07 |
| 2007/0163461 A1* | 7/2007 | Shiwaku | H01L 21/67715 104/89 |
| 2007/0169659 A1* | 7/2007 | Shimamura | E01B 25/22 104/94 |
| 2012/0312188 A1* | 12/2012 | Inui | B60L 5/005 104/288 |
| 2014/0305760 A1* | 10/2014 | Maier | B60L 5/08 191/59.1 |
| 2015/0231973 A1* | 8/2015 | Muller | B60L 5/08 191/49 |
| 2015/0274034 A1* | 10/2015 | Hourtane | B60L 5/39 191/6 |
| 2016/0137101 A1* | 5/2016 | Eckle | H01B 5/08 191/23 R |

FOREIGN PATENT DOCUMENTS

| | | |
|---|---|---|
| DE | 10 2011 001 712 | 10/2012 |
| EP | 1225081 | 7/2002 |
| EP | 1394428 | 3/2004 |
| JP | S5327567 | 3/1978 |
| JP | S63234803 | 9/1988 |

OTHER PUBLICATIONS

International Preliminary Report on Patentability dated Jul. 7, 2015 for PCT/EP2013/077138 filed Dec. 18, 2013.
Result of examination report for patent application for German Application No. 10 2013 100 019.3, filed Jan. 2, 2013 (priority application).
International Search Report dated Mar. 17, 2014 for PCT/EP2013/077138 filed Dec. 18, 2013.

* cited by examiner

ADVANCING UNIT FOR POSITIONING A CURRENT COLLECTOR UNIT

FIELD OF THE INVENTION

The invention concerns an advancing unit for the positioning of a current collector unit according to the preamble of claim 1.

BACKGROUND OF THE INVENTION

Such an advancing unit is known from DE 10 2011 001 712 A1. It is a component of a current collector system, which is fastened to a supporting leg of a crane and can be moved with it along a line on which at least one current track is located. A current collector unit of the current collector system can produce an electric contact with the current track, wherein, for the purpose, the current collector unit can be moved to an introduction device of the path, via the advancing unit which can be displaced in the horizontal direction. The current collector unit can be moved in a vertical direction, supported in a guide on the horizontal advancing unit, wherein current collector contacts of the current collector unit can be moved to the current track in a vertical direction by means of the introduction device, so as to produce an electric contact with it.

U.S. Pat. No. 2,190,213 A1 discloses a flexible cover for a guide track on a tool machine, wherein the cover has the form of a band, which is rolled off from a movable carriage from a spring drum that is placed on the end of the guide track when the carriage is moved away from the spring drum, and is pulled into the spring drum when the carriage is moved toward the spring drum.

DE 940 798 discloses a protective device for tool machines to cover openings that are needed in order to connect a displaceable part of the tool machine with a drive means. An elastic band, which, without the effect of external forces, assumes a stretched or nearly stretched position, is used as a cover band, wherein the axle intended for the winding up of the band is stationary and the band is placed around this axle with a number of windings, in the form of a spiral and under pretension.

Current collector systems of the type mentioned in the beginning are normally used in the open air and are therefore exposed to unfavorable environmental and weather influences. Among these are moisture and soiling due to the deposition of dust or sand and, in the winter, the deposition of snow and the formation of ice by freezing moisture. This can lead to increased friction, corrosion, and, in the worst of cases, to a blocking of the movability of an advancing unit in the area of the running surfaces of guides. A horizontal advancing unit is hereby particularly endangered, because its running surfaces lie approximately horizontal and thus are particularly susceptible for depositions of the previously mentioned type.

SUMMARY OF THE INVENTION

In some embodiments, a generic advancing unit is protected from an impairment of its functionality by unfavorable environmental and weather influences.

Other embodiments as well as refinements and preferred developments of the invention are also disclosed.

This goal is attained in accordance with the invention by an advancing unit with the features of claim 1. Advantageous refinements and preferred developments of the invention are indicated in the subclaims.

In accordance with the invention, a flexible band is placed on the extension of a generic advancing unit; a section of this band at least partially covers the open longitudinal side of the cavity along a section of the extension protruding from the fastening device, and another section is located in a reservoir. A first end of the band is connected either with the fastening unit or with an end of the extension, and the second end of the band is supported on a tensioning device, under a tensile stress, in the longitudinal direction; in this way, with a movement of the extension, by means of which the section of the extension protruding from the fastening device is shortened or prolonged, the band is pulled into the reservoir or is released from the reservoir by the same length and at the same velocity.

Thus, the contact surfaces for guide elements in the cavity are effectively protected against the penetration of dirt, sand, moisture, snow, and foreign bodies, and also guarantee a satisfactory functioning of the guides under unfavorable environmental and weather conditions. A flexible band of variable length, part of which is located in a reservoir and, depending on need, is pulled therein or is released while retaining a tensile stress, is a simple and low-cost solution that does not require any construction changes to the mechanics of the advancing unit as such, and is characterized by its robustness during operation. If the band is connected with one end of the extension, then it is the front end of the extension which, in one end position of the extension that is extended from the fastening unit, extends farther than the other end of the fastening unit.

In a particularly advantageous embodiment, the tensioning device has a deflection roller, which is placed on the front end of the extension and via which the band is conducted, and a carriage that is guided so it can move linearly in the extension and which is kinematically coupled with the extension via a gear in such a way that, with a movement of the extension toward the fastening unit, it moves toward the extension in the same direction and at the same velocity, and the second end of the band is connected with the carriage in a rear section of the carriage, which, in an end position of the carriage that is extended from the extension, is still located within the extension.

In this way, a carriage which is in any case provided for the prolongation of the travelling range of the advancing unit and which moves within the extension in the manner of a telescope is also used to move the second end of the band. In this case, the reservoir for the section of the band that is not needed to cover the cavity is formed by a gap, which is present in this case anyway, between the extension and the carriage in the interior of the extension. The modifications of a generic advancing unit, needed for the protection of the contact surfaces of the guide elements, are therefore only minimal—that is, they are limited to the connection of the ends of the band with the fastening unit or with the carriage and the placement of a deflection roller for the band on the front end of the extension—that is, the end of the extension facing the current collector unit to be moved.

The tensile stress in the band can be established in a simple way and maintained when it is moved in that the deflection roller is arranged so it can be moved in such a way that the tensile stress of the band depends on the position of the deflection roller, and that it can be affixed in an arbitrary position between two end positions in which the tensile stress has a suitable value. Alternatively, the deflection roller can be supported elastically in such a way that the tensile stress of the band is determined by the elastic force of the support.

A likewise advantageous embodiment consists in that the tensioning device and, at the same time, the reservoir for the section of the band not needed to cover the cavity are formed by a spring drum, which winds up or unwinds the band as a function of the movement direction of the extension and is pretensioned by a spring, in the direction of the winding up, in such a way that it keeps the band under a tensile stress in every position of the extension. Spring drums as such are known in the state of the art and have proved useful—that is, a ready-to-use component obtainable on the market can be used. An advantage of this embodiment can be found in that it functions independently of the presence of a carriage that can move in a telescope-like manner within the extension and thus can also be used with an advancing unit that has only one sole extension.

Since, with this embodiment, only the relative movement between the extension and the fastening unit is important, either the spring drum can be placed on one front end of the extension, which, in its extended end position of the extension, is farther away from the fastening unit than its other end if the first end of the band is connected with the fastening unit, or the spring drum can be placed on the fastening unit if the first end of the band is connected with the front end of the extension, which, in its extended end position of the extension, is farther away from the fastening unit than its other end.

It may also be sensible to place the band in such a manner that it completely covers the open side of the cavity only on one of two longitudinal edges of the cavity, running parallel to one another in the advancing direction, and that on the other longitudinal edge, a narrow slit of a predetermined width remains open between the longitudinal edge of the cavity and the band. This makes it possible for the condensation water and the water that seeps into the cavity, because of the incompletely hermetic sealing effect of the band, to flow away from the cavity. This arrangement aims at the case where the longitudinal direction of the extension and thus, also, of the clamped band is the horizontal direction. The completely covered edge of the cavity is, in this case, the upper longitudinal edge and the narrow slit is located on the lower longitudinal edge, wherein the effect of gravity can be utilized to conduct away the condensation and the seepage water.

It is appropriate if the extension has a closed cover on at least one external side, extending in the advancing direction, on which there is no cavity with contact surfaces for guide elements. In this way, it is possible for the interior space of the extension, in which for the prolongation of the travelling range of the advancing unit, a carriage, which can move like a telescope relative to the extension and which has corresponding guide elements and contact surfaces, can be provided, to be effectively protected from soiling and weather influences, without needing for the purpose a second band as a cover, placed, such as on the external side of the extension.

The flexible band should be made of a cold-flexible and moisture-repellent material, and for this purpose, preferably plastic, particularly polyurethane, is suitable. However, polyamide or polyvinyl chloride [are also suitable] and can basically be taken into consideration. The band can be made from one homogeneous material piece, but also from a fabric. The band can be effectively protected from icing and impairment of its flexibility in the case of extreme cold by equipping it with an electrical heating device in the form of flexible conducting wires running along the band or integrated into the band. The connection of such heating wires to a power supply can be carried out on the connection site to the fastening unit.

To protect the cavity covered by the band even better against the penetration of dirt or precipitation, it can be impinged on from the fastening unit by a compressed air supply with an excess pressure relative to the environment. This measure is particularly effective if the cover is not hermetic, in that the blown-in compressed air then flows into the surroundings through slits between the extension and band, and this flow counteracts the penetration of particles through such slits. In particular, the blown-in compressed air can be tempered so as to heat the band, in this manner, at a low ambient temperature.

In order to keep the band clean and dry and to prevent a sticking to the deflection roller or within a band winder on a spring drum, it is appropriate to place a scraper on a site where the moved section of the band passes when the extension moves from the end position retracted into the fastening unit into the end position extended from the fastening unit. The surface of the band is to slide over the surface of the scraper while it is moving.

Finally, if needed, a second flexible band of the same type can also be provided so as to cover a section of the open longitudinal side of the cavity that is not covered by the first band, along a section of the extension protruding from the fastening device in the opposite direction, wherein the ends of the second band can be connected in the same way with the fastening unit, on its opposite side or with the opposite end of the extension, or can be supported on a tensioning device of the same type as that of the first band. In this way, the contact surfaces in the cavity can be protected from soiling and weather influences, particularly if a rear part of the extension, when retracted into the fastening unit, is not sheathed by a housing of the fastening unit, but rather protrudes in the other direction from the fastening unit.

BRIEF DESCRIPTION OF THE DRAWINGS

Other unique characteristics and merits of the invention can be deduced from the following description of a preferred embodiment example with the aid of the accompanying drawings. The figures show the following.

DETAILED DESCRIPTION OF THE INVENTION

Figure 1:
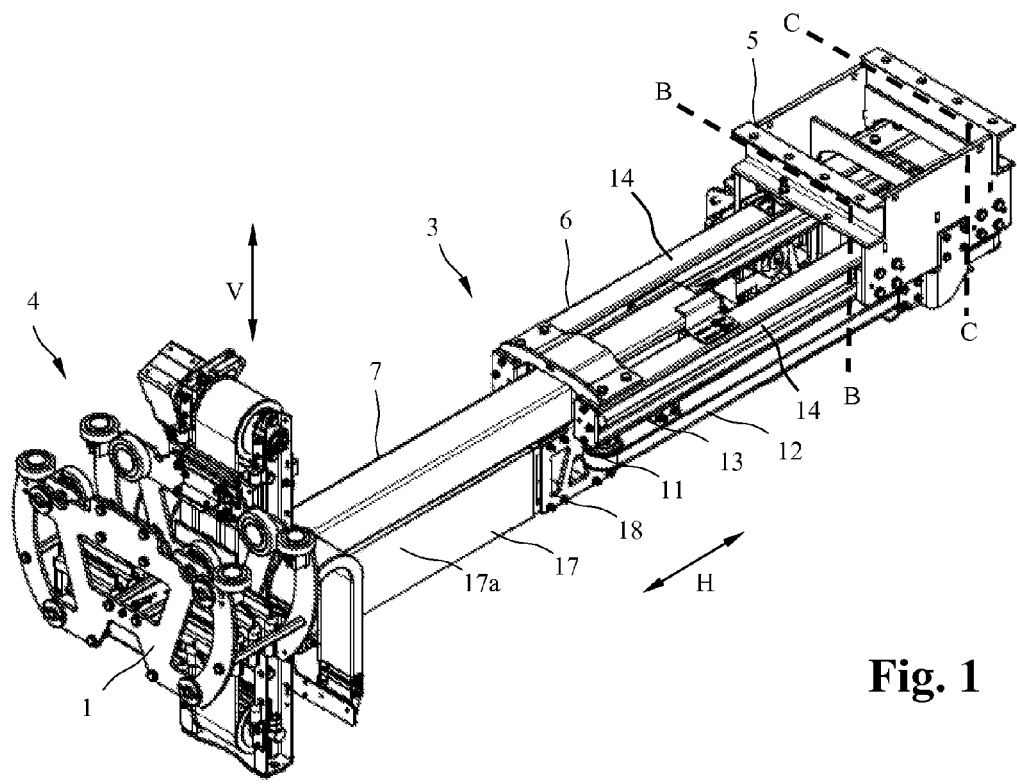
FIG. 1, a three-dimensional view of a current collector system with a horizontal advancing unit according to the state of the art, in an extended end position.

In a three-dimensional view, FIG. 1 shows a current collector system for the current supply of a crane, which is intended to be placed at the foot of a crane, approximately at the same height as a current track arrangement that runs laterally, parallel to a travelling path of the crane. The current collector system has a current collector unit 1 with several current collector contacts 2 (FIG. 3) for the connection with the current track arrangement. The current collector unit 1 can move by means of a horizontal advancing unit 3 and a vertical advancing unit 4 in a horizontal advancing direction H and in a vertical advancing direction V, as is indicated in the Figures with correspondingly marked double arrows.

The horizontal advancing unit 4 has a fastening frame 5, which is provided for fastening to a crane foot. In the fastening frame 5, an extension 6 is supported in a movable manner in the horizontal advancing direction H, which runs transverse to the travelling direction of the crane. The extension 6 can be moved between a retracted end position and an extended end position, shown in FIGS. 1 and 3. In the extension 6, a carriage 7 is supported in such a way that it can move relative to the extension 6, in turn, in the horizontal advancing direction H, wherein the carriage 7 can be retracted completely into the extension 6. The current collector unit 1 is located on the front end of the carriage 7, that is, in FIG. 1, on the left lower end, and in FIG. 3, on the upper end.

Figure 3:
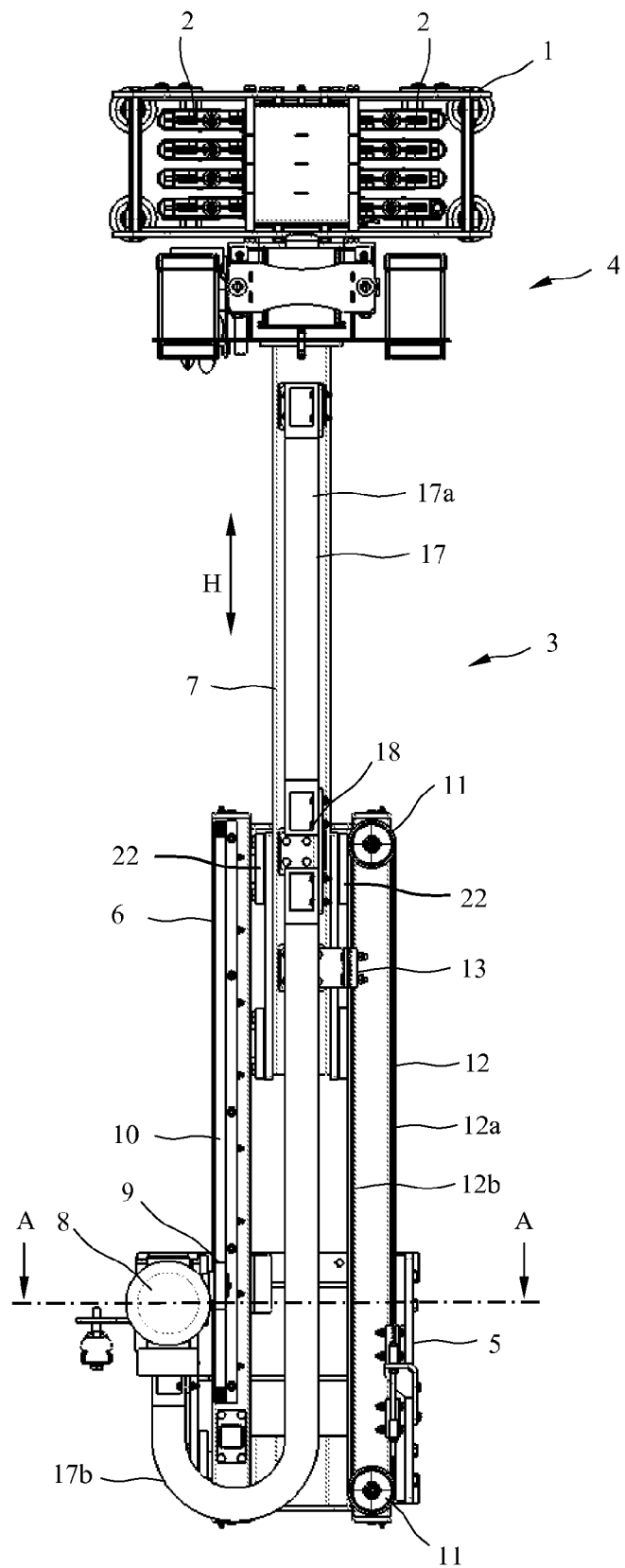
FIG. 3, a view of the current collector system of FIG. 1 from below.

Since both the extension 6 as well as the carriage 7 are situated so they can move in the horizontal advancing direction H, the current collector unit 1 can be moved between a retracted end position in which it lies directly on the fastening frame 5, and an extended end position in which it has the maximum possible distance from the fastening frame 5. FIGS. 1 and 3 show the extended end position.

Figure 2:
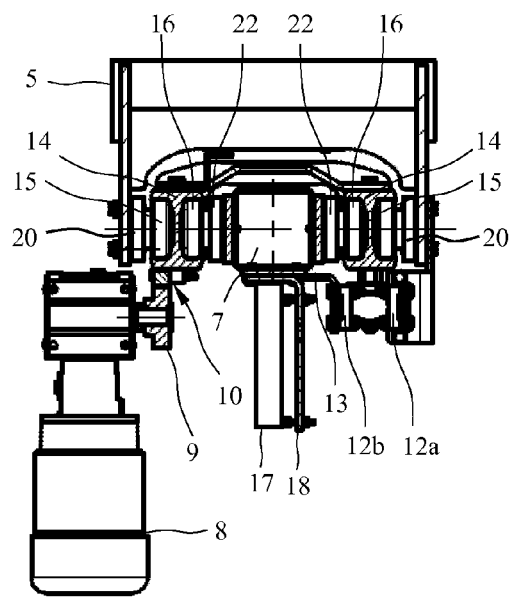
FIG. 2, a section through the horizontal advancing unit of the current collector system of FIG. 1 at the height of line A-A.

The movement of the extension 6 and the carriage 7 is implemented as described below. To move the extension 6, an extension motor 8, designed as an electric motor, is fastened on the fastening frame 5, as can be seen in FIGS. 2 and 3. Via a drive pinion 9, the extension motor 8 drives a toothed rod 10, which is firmly fastened on the extension 6 and which extends almost the entire length of the extension 6. In this way, the extension 6 can be moved between its two end positions. In FIG. 1, the extension motor 8 is concealed by the extension 6 and is therefore not visible.

In order to be able to extend and retract the carriage 7 in a simple manner, without having to provide its own electric motor, deflection rollers 11 (FIG. 3) are placed on the front and rear ends of the extension 6, which can rotate on axles that run vertically. A belt 12 made of an elastic and/or flexible material is laid around the deflection rollers 11 and, as can be seen in FIGS. 2 and 3, is fastened with a fastening end 12a on the fastening frame 5. The carriage 7 is fastened by means of an angle plate 13 on the pulling end 12b of the belt 12.

If the extension 6 is then extended from the refracted end position in the horizontal advancing direction H by the extension motor 8, that is, moved upward in the view of FIG. 3, then the belt 12 is also moved in such a way that, in the view of FIG. 3, it runs clockwise around the deflection rollers 11. Since the carriage 7 is firmly connected with the belt 12, the belt 12 also pulls the carriage 7, so the carriage 7 is moved into the same horizontal advancing direction H as the extension 6. Thus, the extension 6 and the carriage 7 can be uniformly moved between the two end positions with simple means, so that the carriage 7 is always moved relative to the extension 6 at the same velocity as the extension 6 relative to the fastening frame 5.

The section shown in FIG. 2, transverse through the horizontal advancing unit 3 and along the line A-A in FIG. 3, clarifies the structure of the horizontal advancing unit 3. One can clearly see therein the drive of the extension 6 above the extension motor 8, the drive pinion 9, and the toothed rod 10 fastened on the extension 6. The extension 6 has, as lateral carrier parts, two double-T-shaped tracks 14, which are arranged parallel to one another and which are supported so they can move in extension rollers 15, which are supported so they can rotate on the fastening frame 5. Likewise, carriage rollers 16, which are supported so they can rotate on the carriage 7, engage in the other side of the double-T-shaped tracks 14, so that the carriage 7 is supported so it can move on the extension 6. The belt 12 is fastened via the angle plate 13 on a hollow beam of the carriage 7, which is rectangular in cross section.

Since the belt 12 is advantageously made of an elastic material, a connection, which is elastic within certain limits and has an impact-dampening effect, is available between the current collector unit 1 and the fastening frame 5 in the horizontal advancing direction. For example, the belt 12 can be designed as a V-belt or as a toothed belt, wherein the deflection rollers 11 are then correspondingly adapted to the belt shape.

In order to supply the users of the crane with the electrical energy tapped by means of the current collector contacts 11 at a current track arrangement, an energy chain 17, which is in fact known and is flexible in the horizontal direction, is fastened to the lower end of the carriage 7, shown in FIG. 2; it contains the electrical supply lines in the area of the horizontal advancing unit 3. As can be seen, in particular from FIG. 3, the energy chain 17 runs from the fastening frame 5 below the extension 6 and the carriage 7 to the front end of the carriage 7. In the embodiment under consideration, the energy chain 7 is divided into two parts and runs below the extension 6 and the carriage 7. A holder 18 for the part 17a of the energy chain 17 that comes from the front end of the carriage 7 and the part 17b of the energy chain 17 that comes from the fastening element 5 is provided on the rear end of the carriage 1. A cable towing is thus not necessary, which is advantageous since the danger of tearing off the cable that is hanging down, which exists when the cable is towed, is avoided.

Preferably, the extension motor 8 of the horizontal advancing unit 3 can be operated in a regulated manner, so that the start can be carried out slowly, then it is quickly continued, and before the end of the advancing movement, it is decelerated. In this way, the current collector unit 1 can be moved gently to a current track arrangement. In another advantageous embodiment, the expansion motor 8 can also be provided with a position sensor so that the exact position of the current collector unit 1, relative to the crane foot, can be determined from the motor movement.

The horizontal advancing unit 3 has slight wear and tear because of the elastic and/or flexible belt 12, and a rapid advance. Moreover, the horizontal advancing unit 3 has a compact design, since in a manner different from a telescope device of the usual type, several rectangular profiles need not be guided into one another.

The advancing of the current collector unit 1 in the vertical advancing direction V takes place via a vertical advancing unit 4, which has structure comparable to that of the horizontal advancing unit 3, but a shorter travelling range and therefore does not have two movable elements in the sense of the extension 6 and the carriage 7, but rather only one movable element. For the understanding of the invention under consideration, the vertical advancing unit 4 does not need to be explained.

Whereas the fastening frame 5 and the space lying behind, which the extension 6 assumes in its retracted end position, can be reconstructed with one housing, in order to protect the extension 6 from soiling and weather influences, the extension 6 necessarily projects into the free air as soon as it is found in an at least partially extended position, and is there exposed to moisture, soiling, and, in the winter, to the deposition of snow and icing. The running surfaces of the carriage rollers 16 of the carriage 7 on the inside of the double-T-tracks 14 can, on the other hand, be protected by the application of a solid covering on the surface of the extension 6, but not the running surfaces of the extension rollers 15 that are located on the fastening frame 5, on the outside of the double-T-tracks 14.

Figure 4:
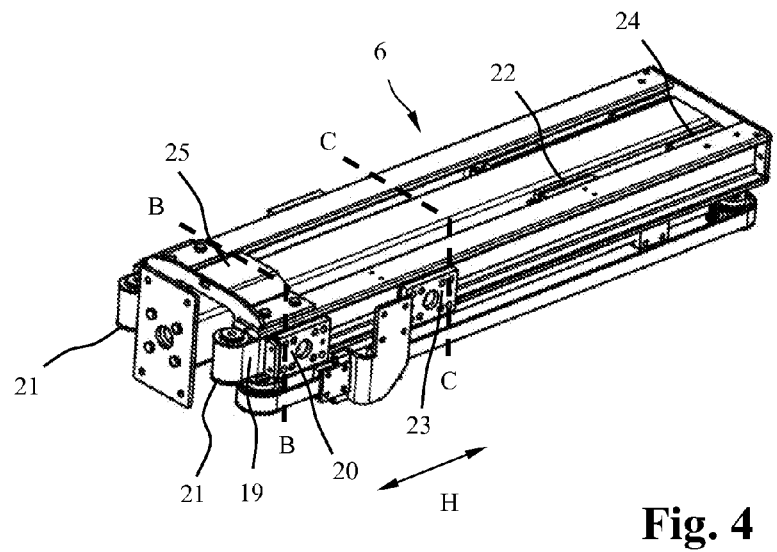
FIG. 4, a three-dimensional view of a horizontal advancing unit in accordance with the invention in a refracted end position.
Figure 5:
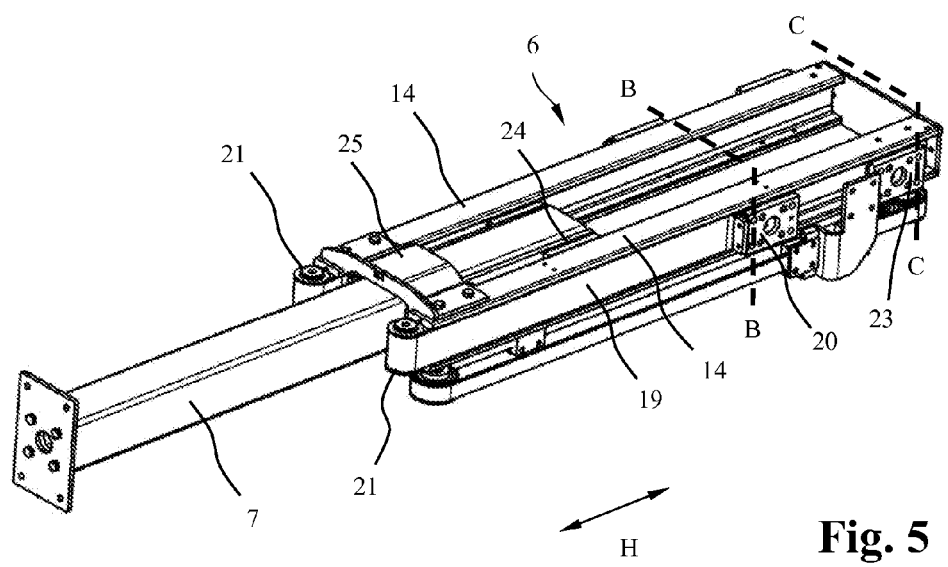
FIG. 5, a three-dimensional view of a horizontal advancing unit in accordance with the invention in an extended end position.

In accordance with the invention, the way in which the running surfaces of the extension rollers 15 on the outside of the double-T-tracks 14, located on the fastening frame 5, can also be protected is shown by FIGS. 4 and 5, in which only the extension 6 and the carriage 7 and a few of the components connected with the extension 6 and the carriage 7 are shown. The entire vertical advancing unit 4 with the current collector unit 1, the fastening frame 5, the extension motor 8, and the energy chain 17 are omitted in these figures for the sake of simplification. FIG. 4 shows the retracted end position of the extension 6 and the carriage 7, whereas FIG. 5 shows its extended end position. To facilitate a comparison with FIG. 1, FIGS. 4 and 5 mark the position of the fastening frame 5, which is not depicted there, with two dotted angles B-B and C-C, which are also entered in FIG. 1.

For the protection from soiling and weather influences, the open side of the cavity on the outside of a double-T-track 14, in which the extension rollers 15 run, are covered on both sides of the extension 6 on one part of their length by a band 19 extending in the longitudinal direction of the double-T-track 14, which corresponds to the horizontal advancing direction H. An end of this band 19 is fastened on a front extension roller carrier 20, on which a front extension roller 15 is supported. This front extension roller carrier 20 is, in turn, firmly connected with the fastening frame 5, which is not shown in FIGS. 4 and 5, wherein the band 19 is also connected with the fastening frame. The section of the cavity that is covered by the band 19 on the outside of the double-T-track 14 is extended, proceeding from the front extension roller carrier 20 to the front end of the double-T-track 14, that is, it is precisely that section which, in an at least partially extended position of the extension 6, protrudes forward—that is, below, to the left in FIG. 5—from the fastening frame 5.

In order to make sure that with a movement of the extension 6, the band 19 is moved synchronously to this movement in the advancing direction H, that is, with a moving out of the extension 6, the section of the band 19 that covers the cavity is prolonged, and with a retraction of the extension 6, is shortened, the band 19 is conducted via a deflection roller that is supported on the front end of the double-T-track 14 such that it can rotate around a vertical axis, and the deflection roller 21 deflects, by 180°, toward the opposite side of the double-T-track 14. There, the band 19 is fastened on a front carriage roller carrier 22, on which a front carriage roller 16 is supported. The front carriage roller carrier 22 is, in turn, firmly connected with the carriage 7, wherein the band 19 is also connected with the carriage 7. The deflected part of the band 19 is concealed by the double-T-track 14 in the viewing direction of FIGS. 4 and 5 and, for that reason, is not visible there.

Since, as was explained previously, the carriage 7 always moves relative to the extension 6 in the same direction as the extension 6 and also relative to the extension 6, thereby has the same velocity as the extension 6 relative to the fastening frame 5, the band is pulled, with the moving out of the extension 6 from the fastening frame, from the inside of the double-T-track 14 via the deflection roller 21 on the outside of the double-T-track 14, and when the extension 6 is retracted into the fastening frame 5, conversely, is pulled from the outside of the double-T-track 14 via the deflection roller 21 on the inside of the double-T-track 14, wherein it always covers the cavity on the outside of the double-T-track 14 in precisely the area that protrudes forwards from the fastening frame 5. The entire length of the band 19 remains constant thereby.

The two end positions of the band 19 are shown in FIGS. 4 and 5. Almost the entire length of the band 19 is located in the interior of the extension 6, that is, on the inside of the double-T-track 14, in the retracted end position of the extension 6 (FIG. 4), whereas in the extended end position of the extension 6 (FIG. 5), almost the entire length of the band 19 is on the outside of the extension—that is, the outside of the double-T-track 14—and covers the open side of the cavity in which the extension rollers 15 run.

The band is made of a flexible and elastic material, such as polyurethane, and is impinged on with a pretension, which can be simply produced by the support of the deflection roller 21. Thus, the deflection roller 21 can be supported eccentrically, so that the pretensioning can be established by a rotation of this support and the affixing in a suitable position. The deflection roller 21 could also be elastically supported such that it can be displaced linearly in the longitudinal direction of the double-T-track 14, in order to produce the pretensioning of the band 19 and to compensate for an ageing-caused elasticity change or a temperature-caused longitudinal change of the band 19. Also, an eccentric support of the deflection roller 21 could be elastically designed in order to obtain the same effect. Furthermore, a spring element could be integrated into the fastening of one of the two ends of the band 19 on the extension roller carrier 20 or on the carriage roller carrier 22.

Instead of a deflection roller 21, a nonmovable body with a rounded and sufficiently smooth surface, via which the band 19 slides with very little friction, could also be used as a deflection element, although a deflection roller 21 for minimizing the friction during the deflection is a particularly preferred solution.

As is indicated in FIGS. 4 and 5, with a second deflection roller 21, the covering of the outside of the extended part of the extension 6 by a band 19, in accordance with the invention, on both sides of the extension 6, which are formed by a double-T-track 14, is similarly provided. It is not problematic that the band 19 is pulled away during the moving out of the extension 6 from its inside, since the extension 6 on its upper side and, if necessary, on its underside also, can be provided with a firm cover, which is not depicted in the figures and which protects the interior of the extension, and thus the other cavity on the inside of a double-T-track 14, from soiling and weather influences.

In order to protect the outside of the extension 6 in the retracted end position as well, according to FIG. 4, in which the extension 6 protrudes backward over the area of the fastening frame 5, the space that is taken up by the extension 6 in this position can be reconstructed with a closed housing. Alternatively to this, however, another band of the same type can be placed around the other end of a double-T-track 14 via another deflection roller. This second band would then be fastened on the rear extension roller carrier 23 and on the rear carriage roller carrier 24. The mode of functioning of such a second band would be completely analogous to that of the first band 19 and to that extent does not require any further explanation.

In a second embodiment of the invention, the band 19 is wound, in the retracted end position of the extension 6 (FIG. 4), on a spring drum, which is located on the front end of the extension 6, instead of the deflection roller 21, and which is under pretension with an internal spring in the winding direction. When the extension 6 is moved out, the band 19 is unwound from the spring drum in this embodiment in order to cover the outside of the extension 6, just like with the first embodiment. This alternative embodiment is not shown in the drawings, since it differs from the first embodiment only by the replacement of the deflection roller 21 with a spring drum of a type which is in fact known, and the fastening of the second end of the band 19 on this spring drum, instead of the front carriage roller carrier 22.

The placement site of the spring drum on the extension 6 essentially corresponds to that of the deflection roller 21. If a spring drum has a greater diameter in comparison to the deflection roller 21 when the band 19 is wound, it can be displaced laterally outward relative to the position of the deflection roller 21 by means of a fastening angle in order to create sufficient space for such a larger diameter.

The pretensioning of the band 19 is already created in this case by the internal spring of the spring drum, so that other measures for the pretensioning of the band 19 can be omitted here. The spring drum can be fastened also on the extension roller carrier 20 instead of on the front end of the extension 6, and the other end of the band 19, instead, on the front end of the extension 6. The advantage of the embodiment is to be found in that it can also be used with an extension 6 alone, without a carriage 7, with the previously described kinematic coupling on the extension 6, whereas the first embodiment presupposes the presence of such a carriage 7 with the aforementioned kinematic coupling for the movement of the second end of the band 19, and for this reason, the configuration was described in detail in the preceding.

Also, the additional lateral cover of the rear part of the extension 6, which protrudes toward the rear over the fastening frame 5 in the retracted end position of FIG. 4, can readily be implemented with the second embodiment, in that a second band is provided on each double-T-track 14, and a second spring drum on the rear end.

In the depicted embodiment example, a number of additional features can be used in accordance with the invention that are not visible or are not shown in the figures. Among these is an arrangement of the band 19 that is slightly nonsymmetrical in the vertical direction, that is, it is displaced upward relative to the center of the double-T-track 14, by means of which a narrow slit remains on the underside between the double-T-track 14 and the band 19, through which condensation water or seepage water can run downward. Moreover, the extension 6 can be provided on its upper side with a cover (not shown), which, similar to the bridge 25, lies on the upper sides of the two lateral double-T-tracks 14 and is fixed there so as to protect the interior of the extension 6 and thus the running surfaces of the carriage rollers 16 on the inside of the double-T-tracks 14 from the penetration of precipitation. Such a cover extends over the entire length of the extension 6 and has a cross-sectional form comparable to the bridge 25.

Furthermore, to avoid the penetration of particles of all types, the cavity covered by the band (19) can be impinged on with a pressure that is excessive, relative to the surroundings. This excess pressure can be made available by a compressed air source on board the vehicle on which the fastening frame 5 is installed, and can be introduced into the cavity behind the band 19 via a compressed air supply line placed on the fastening frame 5 and a channel in the front extension roller carrier 20. Since the band does not seal off the cavity hermetically, an air flow is produced in this case from the cavity through existing slits into the surroundings, which prevents the entry of particles from the surroundings. In order to avoid an escape of the supplied compressed air in the wrong direction—that is, in FIGS. 4 and 5, from the front extension roller carrier 20 toward the right, above—it is possible to provide a sealing on the vertical middle part of the double-T-track 14, on the front extension roller carrier 20, that closes off the cavity in this direction, wherein this sealing need not be hermetical.

The supplied compressed air can be heated in case of a low ambient temperature, so as to heat the band 19 with the air flow. Alternatively, a heating can also be carried out by heating wires on or in the band 19. Finally, a scraper can also be provided on the path of the band 19, so as to constantly clean the band 19 with respect to moisture and particles during operation. In the embodiment shown in FIGS. 4 and 5, a suitable site for the placement of such a scraper would be the front end of the extension, since with a movement of the extension between its two end positions, the band 19 passes this site with its entire length. For example, a scraper could be combined with the deflection roller 21 in that it lies radially on the deflection roller and, in this way, cleans the outside of the band 19 upon passing the deflection roller.

As a use of the invention, a crane that must position its current collector unit on a current track arrangement was indicated in the preceding. The invention, however, can just as well be used with other movable users of electrical energy that must contact a current track or conductor line arrangement by means of a current collector unit. The invention was described in the preceding with the aid of a horizontal advancing unit 3, but its functioning capacity does not depend on the position in space. Therefore, if necessary, it could also be used in a vertical advancing unit 4. Moreover, the invention can also basically be used in an advancing unit in which the object to be positioned is a functional unit other than a current collector unit 2.

The invention claimed is:

1. An advancing unit for positioning of a current collector unit of a vehicle on a current track arrangement, the advancing unit comprising an extension moveable in an advancing direction and guided in a fastening unit on the vehicle to be moveable linearly, wherein the extension has a cavity, which is open on a longitudinal side extending in the advancing direction and having an inner surface forming a contact surface for guide elements situated on the fastening unit, wherein a flexible band is located on the extension, with one section of the band at least partially covering the open longitudinal side of the cavity along a first section of the extension protruding from the fastening unit, and a second section of the band being located in a reservoir, wherein a first end of the band is connected with the fastening unit or with an end of the extension, and wherein a second end of the band is supported under tension in the longitudinal direction on a tensioning device, such that a movement of the extension which decreases the section of the extension protruding from the fastening unit pulls the band into the reservoir by the same length and at the same velocity as the movement of the extension and such that a movement of the extension which increases the section of the extension protruding from the fastening unit releases the band from the reservoir by the same length and at the same velocity as the movement of the extension.

2. The advancing unit according to claim 1, wherein the band is connected with a front end of the extension, which is farther away from the fastening unit than a back end of the extension in an end position of the extension extended from the fastening unit.

3. The advancing unit according to claim 1, further comprising a carriage which is guided to be linearly moveable in the extension, wherein the tensioning device has a deflection roller located on a front end of the extension, by which the band is guided, wherein the carriage is kinematically coupled with the extension by a gear such that, with a movement of the extension relative to the fastening unit, the carriage is moved in the same direction and at the same velocity relative to the extension, and wherein the second end of the band is connected with the carriage in a rear section of the carriage, which is still located within the extension in an end position of the carriage, in which the carriage is moved out from the extension.

4. The advancing unit according to claim 3, wherein the deflection roller is supported to be moveable such that the tension of the band depends on the position of the deflection roller and wherein the deflection roller is affixable between two end positions in an arbitrary position or supported elastically such that the tension of the band is determined by the elastic force of the support.

5. The advancing unit according to claim 1, wherein the tensioning device is formed by a spring drum, which either winds or unwinds the band as a function of movement direction of the extension, and wherein the tensioning device is pretensioned by a spring to keep the band under tension in any position of the extension.

6. The advancing unit according to claim 5, wherein the spring drum is located on a front end of the extension, which, in the extended end position of the extension, is farther away from the fastening unit than a back end of the extension, and wherein the first end of the band is connected with the fastening unit.

7. The advancing unit according to claim 5, wherein the spring drum is located on the fastening unit, and wherein the first end of the band is connected with the front end of the extension, which, in the extended end position of the extension, is farther away from the fastening unit than a back end of the extension.

8. The advancing unit according to claim 1, wherein the band completely covers the open side of the cavity on one of two longitudinal edges of the cavity that are parallel to one another in the advancing direction, and a narrow slit of a predetermined width is provided on the other longitudinal edge, between the longitudinal edge of the cavity and the band.

9. The advancing unit according to claim 1, wherein the extension on at least one outer side, extending in the advancing direction, on which there is no cavity with contact surfaces for guide elements, has a closed cover.

10. The advancing unit according to claim 1, wherein the flexible band is made of a flexible and moisture-repellent plastic material.

11. The advancing unit according to claim 1, wherein the flexible band has an electrical heating device in the form of flexible conducting wires running along the band or integrated into the band.

12. The advancing unit according to claim 1, wherein a compressed air supply is provided, by which the cavity covered by the band is impinged on from the fastening unit, with pressure which is excessive relative to the surroundings.

13. The advancing unit according to claim 1, wherein a scraper, over whose surface the surface of the band slides, is placed at a site passed by the section of the band moved by the extension when the extension moves from the end position retracted into the fastening unit into the end position extended from the fastening unit.

14. The advancing unit according to claim 1, further comprising a second flexible band covering a section of the open longitudinal side of the cavity not covered by the band, along a section of the extension, protruding from the fastening device in the opposite direction, wherein the ends of the second band are connected with the fastening unit or with the extension, or are supported on a second tensioning device.

* * * * *